United States Patent [19]

Lewicki, Jr. et al.

[11] 4,158,070

[45] Jun. 12, 1979

[54] SELECTIVE COOLING OF SHEET TO BE EMBOSSED

[75] Inventors: Walter J. Lewicki, Jr., Lancaster; William M. McQuate, Denver, both of Pa.

[73] Assignee: Armstrong Cork Company, Lancaster, Pa.

[21] Appl. No.: 919,168

[22] Filed: Jun. 26, 1978

[51] Int. Cl.² .............................................. B05D 5/00
[52] U.S. Cl. .......................................... 427/8; 118/69; 264/284; 427/264; 427/374 R; 427/374 D; 427/398 B; 427/398 D
[58] Field of Search ................................ 156/209, 220; 427/374 R, 278, 264, 270, 398 D, 398 B, 374 D, 8; 264/284; 118/69

[56] References Cited

U.S. PATENT DOCUMENTS

| 2,928,124 | 3/1960 | Hugger | 264/284 |
| 3,756,844 | 9/1973 | Bunnell et al. | 118/69 X |
| 4,070,435 | 1/1978 | Lewicki, Jr. et al. | 156/220 X |

Primary Examiner—Evan K. Lawrence

[57] ABSTRACT

A mechanical embossing process wherein a web of material composed of a composite structure having at least a carrier and a thick foam layer to be embossed is heated in an oven to a temperature of 250° F. to 350° F. and thereafter cooled by wetting the carrier, which is the back surface of the web, to approximately 100° F. below the top surface of the web prior to embossing of the foam. In certain areas of the web, hot spots may occur resulting in a top surface-back surface temperature of less than approximately 100° F. Just prior to embossing, these hot spots are eliminated by selectively and intermittently cooling the back surfaces of the hot spot areas to obtain a top surface-back surface temperature difference of approximately 100° F. The process is used for achieving multilevel mechanical embossing of a fused or cured wear layer in register with a print-on and expanded foam.

2 Claims, 1 Drawing Figure

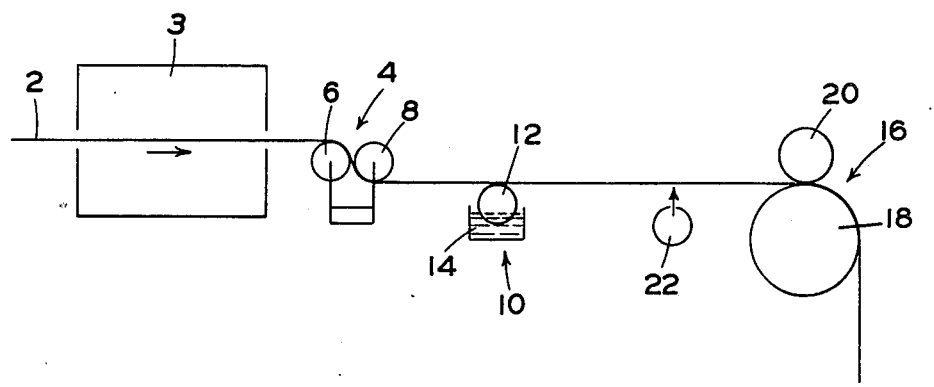

SELECTIVE COOLING OF SHEET TO BE EMBOSSED

CROSS-REFERENCE TO RELATED APPLICATION

This application is an improvement over the invention of U.S. Application Ser. No. 766,941, entitled "Multilevel Embossing of Foamed-Sheet Materials-II," filed Feb. 9, 1977 in the name of Walter J. Lewicki, Jr. et al. and issued as U.S. Pat. No. 4,070,435 on Jan. 24, 1978.

BACKGROUND OF THE INVENTION

1. Field of the Invention

The invention is directed to a process for manufacturing floor covering material and, more particularly, to a process for the mechanical embossing of a pattern on a floor covering material.

2. Description of the Prior Art

U.S. Pat. No. 3,741,851 discloses a product and process which deals with a foamed vinyl floor covering. A printed color, pattern, or design is provided between a foam resin layer and a transparent resin layer. Embossing is carried out relative to the transparent resin layer and the embossing is carried out in-register with the printed pattern.

U.S. Pat. No., 3,176,058 is directed to an apparatus for embossing sheet material. Water cooling means are provided to cool either one or both sides of the sheet prior to embossing.

U.S. Pat. No. 3,305,419 is directed to an apparatus for embossing a foam-backed polyurethane sheet. Surface heating is carried out to heat only the surface to be embossed so that there will be no damage to the underlying foam layer.

U.S. Pat. No. 3,196,062 is directed to a process wherein cooled embossing rolls are utilized to provide an embossed pattern on a sheet material which is composed of a foamable thermoplastic resin base and a thermoplastic resin top coating. Surface heating of the thermoplastic resin is carried out just prior to embossing.

U.S. Pat. No. 2,723,937 is directed to a product for embossing a floor covering wherein embossing is carried out by embossing roll 21 in cooperation with back-up rolls 20 and 23.

U.S. Pat. No. 3,776,797 is directed to an embossing structure wherein embossing is carried out with an embossing roll 22 and back-up rolls 23 and 25.

U.S. Pat. No. 3,246,365 is directed to an embossing apparatus using plural embossing rolls and back-up rolls.

U.S. Pat. No. 3,338,731 is directed to a process for embossing poly(vinyl chloride) coatings on a support base.

Finally, U.S. Pat. No. 3,239,399 is directed to the use of air cooling of a sheet material.

SUMMARY OF THE INVENTION

In the inventive process herein, a web of material is formed which is composed of a composite structure having at least a carrier and a thick foam layer. The foam layer on the surface thereof adjacent the surface to be embossed had a decorative pattern printed thereon.

The composite structure is in the form of a web which has been heated in an oven to a temperature of about 250° F. to 350° F. (121° C. to 177° C.). As the web leaves the oven, the back or the carrier of the web is wetted to lower the temperature of the back surface of the web approximately 100° F. below the top surface of the web. Subsequently, the embossable surface of the web is embossed using a back-up roll and an embossing roll. The embossed surface is cooled to set the embossed pattern in that surface. During the forming of the composite web, it is possible that a nonuniform cross section can be formed in the web. This nonuniform cross section will then provide differential heat gradients from the front to the back of the web. Therefore, in some areas the back of the web may be less than approximately 100° below the top surface of the web. In order to cool these areas which don't have the desired heat gradient, prior to the embossing of the top surface of the web, a selective and intermittent cooling of these areas of the web is carried out so that the temperature of the back surface of the web at embossing is approximately 100° or more below the top surface of the web.

BRIEF DESCRIPTION OF THE DRAWING

The FIGURE of the drawing is a schematic showing of the process and apparatus for carrying out the invention herein.

DESCRIPTION OF THE PREFERRED EMBODIMENTS

The invention herein is an improvement over the process for manufacturing as set forth in U.S. Pat. No. 4,070,435. A web of material 2 moves from an oven 3 and the web as it leaves the oven is at about 225° F. (107° C.) to about 325° F. (163° C.). The warm web 2, moves from the oven structure 3 and passes around a conventional guider structure 4 which simply maintains the registry of the printed pattern of the web with the embossing roll pattern in a direction transverse to the direction of web movement. The guider structure 4 is composed of two guide rolls 6 and 8. The back of the web will pass over roll 6 and then the web will pass under roll 8, with the roll surface in contact with the surface of the web to be embossed. The surface will be quite warm and, therefore, roller 8 should be covered with a "Teflon TM" coating to prevent sticking of the upper embossable surface of the web against the surface of the roll 8. Roll 8 is usually maintained at a surface temperature of 200° F. to 250° F. (93° C. to 121° C.) in order to maintain a hot embossable surface. The assembly 4 is a commercially available "Kamberoller TM" which consists of two angled guide rolls on a carriage mounted for transverse movement. The transverse guiding of the sheet is carried out through the use of the "Kamberoller TM", but could equally well be carried out by simply the use of guide bars which are placed along the edge of the web and would guide the web edge and, therefore, the pattern edge relative to the embossing roll farther down the processing line. U.S. Pat. Nos. 3,024,955 and 2,797,091 show typical "Kamberoller TM" structures.

The web then passes over a back wetting structure 10 which is preferably a felt-covered roller 12 partially immersed in a bath of liquid 14. The felt-covered roller 12 of the back wetting structure 10 could be replaced by a steel roller, or even a water spray system. The back wetting structure applies water to the complete back side of the web, the area of the web that is not to be embossed, so as to cool the back side of the web and stabilize the hot thermoplastic foam next to the back side of the web. The application of the water and its evaporation on the back side of the web cools the back side of the web and its adjacent foam layer to 130° F. to 200° F. (55° C. to 93° C.) by the time the web enters the embossing apparatus. The rate of water application is governed by the quantity of heat to be removed from the hot thermoplastic foam next to the back side of the web to keep the printed foam from distorting and blistering at the embossing nip. The time of water application occurs 3–30 seconds before embossing. Meanwhile, the upper surface, the embossable surface, of the web is at about 215° F. to 300° F. (99° C. to 149° C.).

The embossing structure 16 is basically composed of a back-up roll 18 and an embossing roll 20. The back-up roll and embossing roll can be driven by separate power sources. However, it is contemplated according to this invention that they are coupled together through a power transmission system as described in U.S. Pat. No. 3,741,851. The back-up roll will be cooled by chilled water so that the back-up roll has a surface temperature of about 75° F. to 100° F. (24° C. to 38° C.), and this chilled back-up roll 18 will function to further cool the back side of the web. It is possible to partially wrap the web around the back-up roll before embossing so that the steel back-up roll will function both as a cooling drum and as a back-up for the embossing roll 20. Also partial wrapping of the web around the back-up roll 18 provides for good frictional contact between these two. Movement of the web 2 causes a rotational movement of roll 18, and the transmission between rolls 18 and 20 then cause rotation of the embossing roll 20. Wrapping of the web of material around the embossing roll 20 may be carried out to help set the embossed pattern in the embossing roll.

Since there is a need to register the embossing pattern with the printed pattern of the web, there must be control of the embossing roll pattern relative the printed pattern to get registry between the two patterns. This will require registry along the machine direction, and this registry along the machine direction or in the direction longitudinally of the sheet movement is maintained in the same manner as set forth in U.S. Pat. No. 3,655,312, column 5, line 53, to column 6, line 41. The technique of U.S. Pat. No. 3,694,634 and U.S. Pat. No. 3,741,851 can be adopted herein for machine direction registry also. Finally, registry in the machine direction can be secured using Model R-500 Digital Control and Model R-425-1 Feathering Drive Control of "Registron TM" Division of Bobst Champlain, Inc. At this point, it should be noted that registration controls, both across the machine direction and along the machine direction, are necessary to secure a commercially acceptable product with registration between the embossed pattern and the printed pattern, but such controls are not part of the invention herein, since they are conventional in the art. The essence of the invention herein is to be defined below.

For foam webs having considerable thicknesses [0.100–0.120 inches (0.25 cm to 0.3 cm)] which retain their internal heat, it has been found that two back wetting structures tend to be used. Of course, thicker foams or intricate patterns may further require the use of two back wetting structures and even cooling around the back-up roll 18. The invention herein is particularly useful with the products described in U.S. Pat. No. 4,070,435, and the products of that patent and processes for making them are incorporated herein by reference. Normally, a web of flooring material which has a wear layer, a backing or a carrier and a thick foam layer (0.090 inch; 0.23 cm) thereon may be embossed at line speeds of 75 to 80 feet/minute with 0.017 inch (0.043 cm) deep embossing rolls. The ovens are generally run at an average temperature of 356° F. (180° C.) and heat the web to an exit temperature of 300° F. (150° C.). Two back wetting structures 10 are required to produce the proper temperature gradient for embossing without blistering. The proper temperature gradient is the difference between the temperature of the embossable surface and the temperature of the back of the carrier which is being wetted by the back wetters. The web of material can be embossed as described above with extremely good yields and very little scrap attributed to print distortion and/or blisters. However, upon occasion, localized areas of the hot vinyl sheet being embossed would start to distort in the nip. The distortion would be the development of a blister in the foam layer. This would usually occur because heat in the blister area had not been sufficiently removed from the back of the sheet prior to embossing to get a proper temperature gradient of about 100° between the top surface of the web and the back surface of the web. The localized heat retention and blister associated therewith would appear to be related to thick or thin gel spots. The foamable material would be placed down as a liquid coating and gelled, and it is possible that thick or thin spots would be formed. These spots, when expanded, would naturally cause thick or thin spots in the foam layer and would result in a different heat history from that desired.

Initially, the blister problem is visually seen by either a distortion in the pattern just embossed or the build up of embossable material at a localized spot just prior to the time that the web was entering the embossing nip. However, with these features, almost simultaneously therewith an audible indication of the blister would be provided in that the embossing operation would rupture the blister, and the air tearing through the web would make a cracking sound. Naturally, this would damage the web at this point in addition to the fact that the embossed pattern prior to this point of rupture would be distorted.

The solution to this problem was accomplished by placing underneath the sheet, between the point of any back wetting and the nip of the embossing apparatus 16, a means 22 for directing air against the back of the web. Generally, a 2-34" diameter pipe, 1 meter long, would be provided with a 1/32 wide slot therealong. Through this slot there would be directed high velocity air (6,000 feet/minute) against the back wetted carrier in the localized blister area before the web made contact with the back-up roll. Approximately a 25° F. improvement in the temperature drop was measured on the back of the sheet at the embossing nip, and print distortion was eliminated in 5 to 10 seconds. Since the web being manufactured would be up to 4 meters in width, four separate air nozzle structures 22 would be utilized across the sheet. These would be controlled by valve structures, and thus they could be selectively and intermittently turned on. The valves would permit one to turn the air on only when it was needed and would permit one to provide air only to that portion of the sheet where a blister was forming. Normally, a blister would be localized in an across the web direction and would not extend across the whole web. Should one indiscriminately apply cooling air to the whole back of the web, the whole width of the web would then suffer a temperature gradient change. In those areas where the temperature gradient was acceptable for embossing, it would be altered by the cooling area, and the embossable surface of the sheet would be lowered to the point that unacceptable embossing conditions would exist. Ideal embossing would be carried out at a certain temperature and cooling below this temperature provides shallow embossing. Consequently, it is necessary that a certain embossing temperature be maintained on the embossable surface of the sheet. The hot spots or blisters are the result of an elevated temperature, and there is a need to lower the temperature only at these points. The blister condition occurs when the temperature gradient between the embossable surface of the web and the back of the web has not been maintained above approximately 100°. The air cooling removes additional heat from the back of the web and, therefore, increases the temperature gradient between the embossable surface and the back of the web. This might have some minor effect upon the surface temperature of the web, but normally the area of the hot spot being cooled does not have a drop of the embossable surface temperature to the point that unacceptable embossing occurs. However, in areas where a proper temperature gradient exists, the indiscriminate use of cooling air can increase the temperature gradient to the point that the embossable surface of the sheet has its temperature drop below the point at which acceptable embossing occurs. Consequently, it is important to the invention herein that the cooling air provided to the back of the web be selectively provided and only intermittently provided when the blister condition is starting to occur, and this will be when the temperature of the back surface of the web is less than approximately 100° below the top surface of the web in a localized area.

The means 22 could be used to direct both air and water against blister areas. Normally, the means 22 is located before the embossing nip a distance so that the air will have time to lower the temperature at the blister area.

What is claimed is:
1. In a process for embossing a web of material wherein said material is composed of a composite structure having at least a carrier and a thick foam layer, said foam layer on the surface thereof adjacent the surface to be embossed having a decorative pattern printed thereon, said above composite structure being in the form of a web which is heated in an oven to a temperature of about 250° F. to 350° F., comprising the steps of:
 (a) after the carrier of the web leaves the oven, wetting the carrier of the web, which is the back surface of the web, so as to lower the temperature of the back surface of the web approximately 100° below the top surface of the web, which is the surface to be embossed, except where there may be local heat retention in some hot spot areas of the web resulting in a top surface-back surface temperature difference of less than approximately 100° F.;
 (b) embossing the top surface of the web with an embossing roll and back-up roll;
 (c) cooling the embossing surface of the web to set the embossed pattern in the web;
 (d) the improvement comprising:
  (1) prior to embossing the top surface of the web with an embossing roll and back-up roll, selectively and intermittently cooling the back surfaces of said hot spot areas to obtain a top surface-back surface temperature difference of approximately 100° F.

2. A process for embossing a web of material as set forth in claim 1 wherein there is the additional step of detecting the hot spot areas and then carrying out the selective cooling by intermittently directing a stream of air only at the back surfaces of the hot spot areas.

* * * * *